(12) United States Patent
Ito

(10) Patent No.: US 8,207,696 B1
(45) Date of Patent: Jun. 26, 2012

(54) TRANSFER CHARACTERISTIC BASED MOTOR SPEED CONTROL

(75) Inventor: Kiyotada Ito, Kiratsuka (JP)

(73) Assignee: Marvell International Ltd., Hamilton (BM)

( * ) Notice: Subject to any disclaimer, the term of this patent is extended or adjusted under 35 U.S.C. 154(b) by 663 days.

(21) Appl. No.: 12/358,653

(22) Filed: Jan. 23, 2009

Related U.S. Application Data

(60) Provisional application No. 61/029,728, filed on Feb. 19, 2008.

(51) Int. Cl.
H02P 6/18 (2006.01)

(52) U.S. Cl. ......... 318/400.34; 318/400.01; 318/400.07; 318/400.24; 318/268

(58) Field of Classification Search ............ 318/268, 318/400.01, 400.07, 400.16, 400.23, 400.24, 318/400.32, 400.34; 360/6, 18, 22, 25, 26, 360/27, 31, 73.01, 73.02, 75, 77.4
See application file for complete search history.

(56) References Cited

U.S. PATENT DOCUMENTS

| | | | |
|---|---|---|---|
| 5,982,571 A * | 11/1999 | Calfee et al. | 360/70 |
| 6,104,153 A * | 8/2000 | Codilian et al. | 318/362 |
| 6,972,540 B1 * | 12/2005 | Wang et al. | 318/400.34 |
| 7,106,547 B1 * | 9/2006 | Hargarten et al. | 360/77.04 |
| 7,132,815 B2 * | 11/2006 | Asano et al. | 318/625 |
| 7,170,249 B2 * | 1/2007 | Ang et al. | 318/560 |
| 7,227,321 B1 | 6/2007 | Rana et al. | |
| 7,378,810 B1 * | 5/2008 | Sutardja et al. | 318/268 |
| 7,391,584 B1 * | 6/2008 | Sheh et al. | 360/51 |
| 7,656,605 B1 * | 2/2010 | Sutardja | 360/77.04 |
| 7,667,417 B2 * | 2/2010 | Chu et al. | 318/400.01 |
| 7,990,089 B1 * | 8/2011 | Ying et al. | 318/400.13 |

OTHER PUBLICATIONS

Abramovitch et al.; "Decomposition of Baseline Noise Sources in Hard Disk Position Error Signals Using the PES Pareto Method"; Proceedings of the 1997 American Controls Conference in Albuquerque, NM; Jun. 3-6, 1997; 5 pages.

* cited by examiner

*Primary Examiner* — Walter Benson
*Assistant Examiner* — Thai Dinh

(57) ABSTRACT

A system includes a speed control module, a repeatable component measuring module, and a repeatable component correcting module. The speed control module controls a speed of a motor based on an error signal generated based on a desired speed and back electromotive force. The error signal includes a repeatable component of noise. The repeatable component measuring module measures the repeatable component. The repeatable component correcting module corrects the repeatable component based on transfer characteristics of the speed control module and the motor and generates a corrected repeatable component.

20 Claims, 15 Drawing Sheets

FIG. 11

| RPM | Rotation Angle | Temperature | Correction Value |
|---|---|---|---|
| N1 | θ1 ≤ θ < θ2 | T < T1 | Correction Value A |
| | | T1 ≤ T < T2 | Correction Value B |
| | | ------ | ------ |
| | θ2 ≤ θ < θ3 | ------ | ------ |
| | ------ | ------ | ------ |
| N2 | ------ | ------ | ------ |
| ------ | ------ | ------ | ------ |

TRANSFER CHARACTERISTIC BASED MOTOR SPEED CONTROL

CROSS-REFERENCE TO RELATED APPLICATIONS

This application claims the benefit of U.S. Provisional Application No. 61/029,728, filed on Feb. 19, 2008. The disclosure of the above application is incorporated herein by reference in its entirety.

FIELD

The present disclosure relates to rotating storage devices, and more particularly to controlling speed of motors that rotate storage media of the rotating storage devices.

BACKGROUND

The background description provided herein is for the purpose of generally presenting the context of the disclosure. Work of the presently named inventors, to the extent the work is described in this background module, as well as aspects of the description that may not otherwise qualify as prior art at the time of filing, are neither expressly nor impliedly admitted as prior art against the present disclosure.

Rotating storage devices include hard disk drives (HDDs) and optical disc drives. Examples of optical disc drives include compact disc (CD) drives and digital versatile disc (DVD) drives. Data is stored on a magnetic medium in the HDDs. Data is stored on an optical disc (e.g., a CD or a DVD) in the optical disc drives. A spindle motor rotates the magnetic medium of the HDDs at a predetermined speed. A spindle motor rotates an optical disc of the optical disc drives at a predetermined speed. Although HDDs are used as examples only throughout the disclosure, the following discussion applies equally to optical disc drives.

Referring now to FIG. 1, a HDD 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element, such as an inductor, that generates a magnetic field and a read element, such as a magneto-resistive (MR) element, that senses the magnetic field on the platter 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write (R/W) channel (hereinafter, "read-channel") module 28.

The HDD PCB 14 includes the read-channel module 28, a hard disk controller (HDC) module 30, a processor 32, a spindle/VCM driver module 34, volatile memory 36, non-volatile memory 38, and an input/output (I/O) interface 40. During write operations, the read-channel module 28 may encode the data to increase reliability by using error-correcting codes (ECC) such as run length limited (RLL) code, Reed-Solomon code, etc. The read-channel module 28 then transmits the encoded data to the preamplifier device 26. During read operations, the read-channel module 28 receives analog signals from the preamplifier device 26. The read-channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the heads 20 over the platters 16 during read/write operations. Servo, which is stored on the platters 16, ensures that data is written to and read from correct locations on the platters 16. In some implementations, a self-servo write (SSW) module 42 may write servo on the platters 16 using the heads 20 prior to storing data on the HDD 10.

SUMMARY

A system comprises a speed control module, a repeatable component measuring module, and a repeatable component correcting module. The speed control module controls a speed of a motor based on an error signal generated based on a desired speed and back electromotive force. The error signal includes a repeatable component of noise. The repeatable component measuring module measures the repeatable component. The repeatable component correcting module corrects the repeatable component based on transfer characteristics of the speed control module and the motor and generates a corrected repeatable component.

The error signal further includes non-repeatable components of the noise. The system further comprises a non-repeatable component measuring module that measures the non-repeatable components and a non-repeatable component correcting module that corrects the non-repeatable components based on the transfer characteristics.

The non-repeatable components include a first component due to white noise and a second component due to pink noise. The non-repeatable component measuring module measures the first and second components based on the error signal and the repeatable component.

In other features, a hard disk drive (HDD) comprises a hard disk controller (HDC) that comprises the system and the motor that rotates a magnetic storage medium of the HDD at the desired speed. An optical disc drive comprises an optical disc drive controller that comprises the system and the motor that rotates an optical storage medium of the optical disc drive at the desired speed.

In other features, a method comprises controlling a speed of a motor using a speed control module based on an error signal that is generated based on a desired speed and back electromotive force and that includes a repeatable component of noise. The method further comprises measuring the repeatable component, correcting the repeatable component based on transfer characteristics of the speed control module and the motor, and generating a corrected repeatable component.

The error signal further includes non-repeatable components of the noise. The method further comprises measuring the non-repeatable components and correcting the non-repeatable components based on the transfer characteristics.

The non-repeatable components include a first component due to white noise and a second component due to pink noise. The method further comprises measuring the first and second components based on the error signal and the repeatable component.

The method further comprises controlling a rotating storage device comprising the motor and the control module and rotating a storage medium of the rotating storage device at the desired speed using the motor and the control module. The method further comprises selecting the rotating storage device from a group consisting of a hard disk drive (HDD) and an optical disc drive.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 11 depicts a table of exemplary data output by the error processing module of FIG. 4B.

DESCRIPTION

Figure 1:
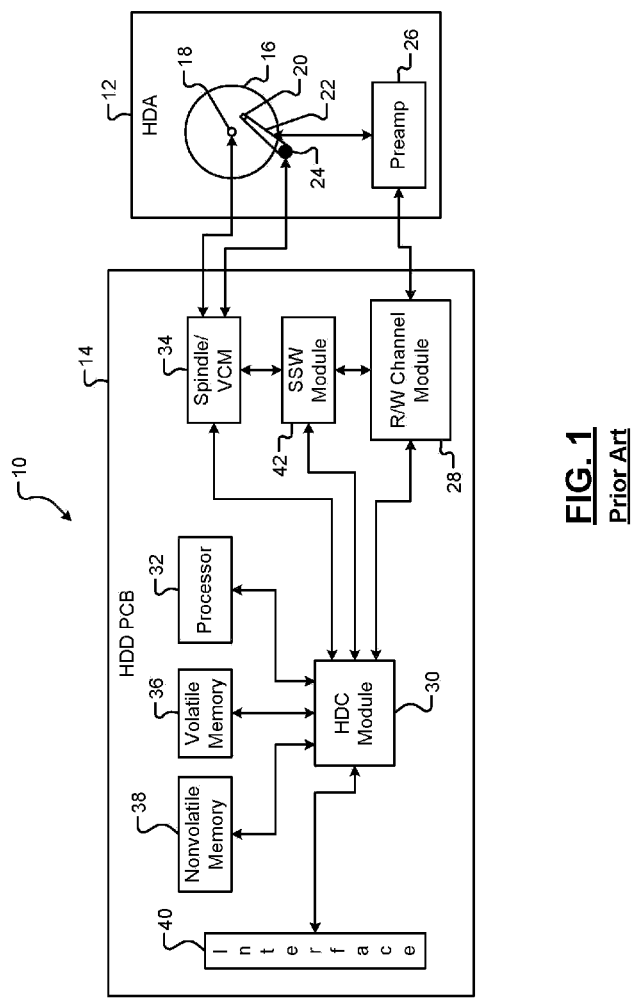
FIG. 1 is a functional block diagram of a hard disk drive (HDD)

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Spindle motors typically include brushless direct current (DC) motors. A brushless DC motor includes a rotor having a plurality of magnetic poles and a stator having a plurality of drive coils. The magnetic poles having alternating polarities are typically positioned along the circumference of the rotor with approximately equal spacing.

A driver module that drives the spindle motor detects the relative positions of the rotor and the stator. The driver module selects a drive coil from the plurality of drive coils according to the detected relative positions. The driver module supplies a drive current or a drive voltage to the selected drive coil. The drive coil generates a magnetic field having different phases. The magnetic field interacts with the magnetic poles of the rotor to rotate the spindle motor in a predetermined direction.

The driver module receives a control signal designating a desired speed of the spindle motor from a speed control module. The driver module adjusts the value of the drive voltage or the drive current based on the control signal to maintain the speed at the desired speed.

The driver module detects back electromotive force (BEMF) from the drive coils that are not supplied with the drive current. The driver module detects the relative positions of the stator and the rotor based on the detected BEMF. The driver module generates a detection signal based on the BEMF and outputs the detection signal to the speed control module. The detection signal indicates a measured speed of the spindle motor. Based on a difference between the desired and measured speeds, the speed control module generates the control signal that sets the speed of the spindle motor to the desired speed.

Occasionally, the positions of the magnetic poles may deviate from the desired positions. The deviation in position of the magnetic poles is called pole mismatch. Due to the deviation (i.e., due to the pole mismatch), the BEMF detected from the drive coils may differ for each group of magnetic poles. Since the detection signal is generated based on the BEMF, the detection signal may include noise caused by the deviation (i.e., by the pole mismatch). When the detection signal includes the noise, the speed control module cannot accurately control the speed of the motor.

A speed control system may control the speed of the spindle motor close to the desired value by detecting the noise caused by the pole mismatch in advance and adding a correction value for eliminating the noise to the control signal. The noise caused by the pole mismatch, however, may be different during normal operation than when detected in advance due to control characteristics of the spindle motor, the speed control module, the driver module, etc. The noise during normal operation cannot be correctly analyzed when these control characteristics are not considered. Consequently, the speed of the spindle motor cannot be controlled accurately.

The speed control system of the present disclosure relates to controlling the speed of the spindle motor based on the control characteristics of control modules and circuits that control the operation of the spindle motor. Errors in the measured speed are divided into repeatable and non-repeatable components. The non-repeatable components are further divided into components of measured noise and components of force disturbance. The components of measured noise are modeled as white noise, and the components of the force disturbance are modeled as pink noise. The repeatable and non-repeatable components are processed and corrected based on transfer functions of the control modules and control circuits. Correction values are generated to correct errors in the measured speed due to the repeatable and non-repeatable components of the noise. The correction value is subtracted from the measured speed to generate a control signal that includes corrected error and that accurately controls the speed of the spindle at the desired speed.

Although the spindle motor is used as an example throughout the disclosure, the speed control system can be used to control speed of any brushless DC motor. For example, the speed control system can be used to control speed of motors that rotate optical discs of optical disc drives. Examples of optical disc drives include compact disc (CD) drives and digital versatile disc (DVD) drives. Although a DC motor is used as an example throughout the disclosure, the teachings of the disclosure can also be applied to alternating current (AC) motors. The terms measured noise and detected noise are used interchangeably throughout the disclosure. The terms transfer function and transfer characteristic are used interchangeably throughout the disclosure.

Figure 2:
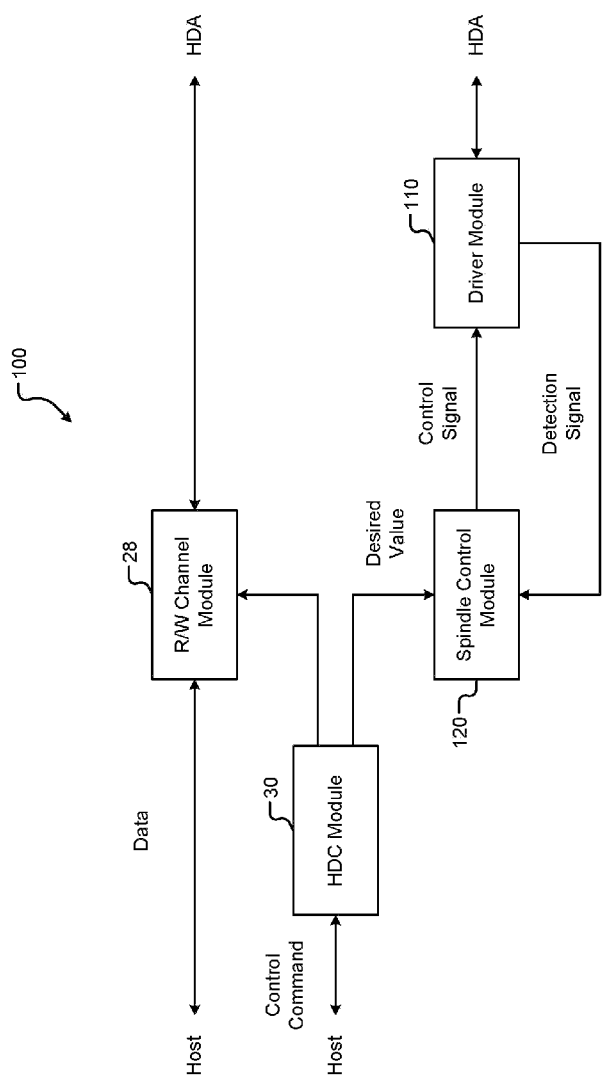
FIG. 2 is a functional block diagram of a speed control system that controls the speed of a spindle motor of the HDD of FIG. 1.

Referring now to FIG. 2, an exemplary speed control system 100 that controls the speed of the spindle motor 18 according to the present disclosure is shown. The speed control system 100 comprises the spindle motor 18, a driver module 110, a spindle control module 120, the read-channel module 28, and the hard disk controller (HDC) module 30.

The spindle motor 18 may include a brushless DC motor. The spindle motor 18 may include a rotor having a plurality of magnetic poles (e.g., six poles) and a stator having a plurality of drive coils (all not shown). The magnetic poles having alternating polarities are typically positioned along the circumference of the rotor with approximately equal spacing. The drive coils of the stator apply a magnetic field having different phases (e.g., three phases) to the magnetic poles of the rotor.

The driver module 110 drives the spindle motor 18. The driver module 110 rotates the rotor of the spindle motor 18 by supplying a three-phase drive current or drive voltage to the plurality of drive coils of the spindle motor 18. The driver module 110 detects the BEMF from the drive coils that are not supplied with the drive current or the drive voltage. The driver module 110 detects the relative positions of the stator and the rotor based on the detected BEMF. The driver module 110 selects a drive coil from the plurality of drive coils according to the detected relative positions. The driver module 110 supplies the drive current or the drive voltage to the selected drive coil to rotate the spindle motor 18 in the predetermined direction at the desired speed.

The driver module 110 receives a control signal designating the desired speed of the spindle motor 18 from the spindle control module 120. The driver module 110 changes the drive voltage or the drive current being supplied to the spindle motor 18 according to the control signal. Thus, the driver module 110 can control the speed of the spindle motor 18 at the desired speed designated by the control signal. The driver module 110 also generates a detection signal that indicates the measured speed of the spindle motor 18 based on the BEMF detected from the spindle motor 18. The driver module 110 feeds back the detection signal to the spindle control module 120.

The spindle control module 120 controls the speed of the spindle motor 18 at the desired value. More specifically, the spindle control module 120 receives the detection signal generated by the driver module 110. The spindle control module 120 may receive the desired speed from the HDC module 30. The HDC module 30 may generate a signal indicating the desired speed based on a control instruction received from a host (not shown) and may output the signal to the spindle control module 120.

The spindle control module 120 measures a difference (i.e., an error) between the desired speed and the measured speed indicated by the detection signal. The spindle control module 120 generates a control signal to compensate the difference. The spindle control module 120 outputs the control signal to the driver module 110, thereby bringing the speed of the spindle motor 18 gradually closer to the desired value.

Figure 3:
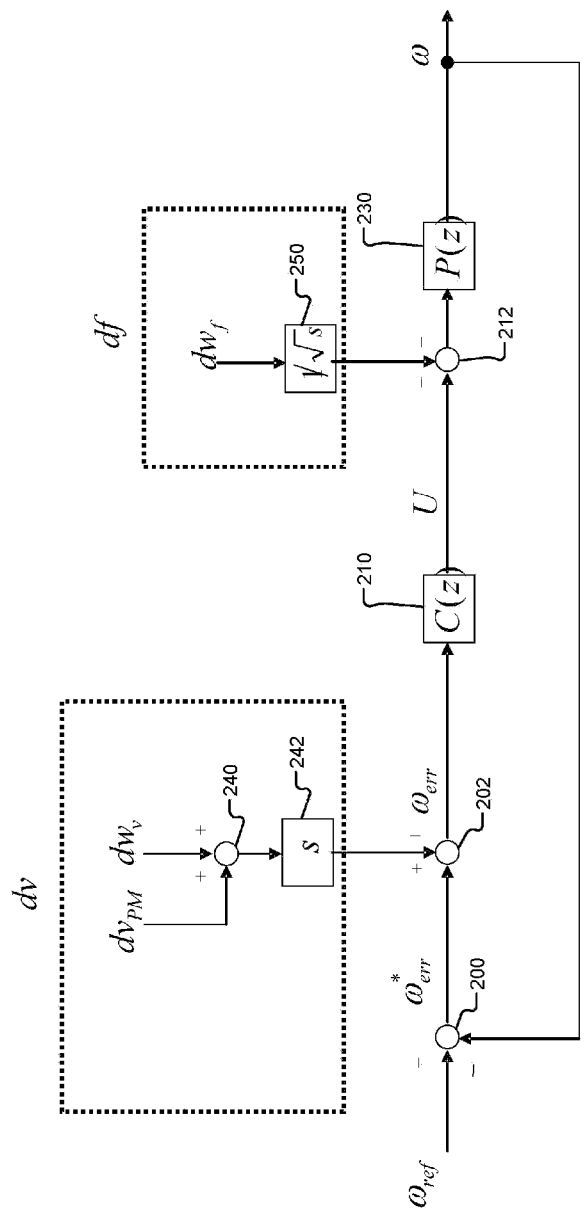
FIG. 3 is a schematic of a noise model of the speed control system of FIG. 2.

Referring now to FIG. 3, a noise model of the speed control system 100 according to the present disclosure is shown. The error includes noise. The noise includes repeatable and non-repeatable components. The non-repeatable components include components of measured noise and force disturbance. The noise model comprises an adding point 200, an adding point 202, a transfer function 210, an adding point 212, and a transfer function 230.

In the noise model, dv denotes detected noise (i.e., measured noise), and df denotes force disturbance. The force disturbance df is a disturbance that is added to the controlled variable. The force disturbance is a noise component having a frequency characteristic of energy inversely proportional to the frequency. $\omega_{ref}$ denotes the desired speed of the spindle motor 18. The output of the speed control system 100 is denoted by $\omega$, which denotes the actual speed at which the rotor of the spindle motor 18 rotates. $\omega$ is an example of a controlled variable, and $\omega_{ref}$ is an example of a desired value of the controlled variable.

At the adding point 200, $\omega$ is subtracted from $\omega_{ref}$ to obtain $\omega^*_{err}$. In other words, $\omega^*_{err}$ denotes the error between an error between the actual speed (i.e., the measured speed) and the desired speed. At the adding point 202, the detected noise dv is added to $\omega^*_{err}$ to obtain $\omega_{err}$. In other words, $\omega_{err}$ denotes the error between the desired speed and the measured speed.

The transfer function 210 corresponds to the spindle control module 120. The transfer function 210 receives $\omega_{err}$ as input. The transfer function 210 outputs a controlled variable U. The adding point 212 generates a sum of the force disturbance df and the controlled variable U and outputs the sum to the transfer function 230. The transfer function 230 corresponds to the spindle motor 18. The transfer function 230 outputs $\omega$, which is fed back to the adding point 200. Although not shown, transfer functions of other control modules (e.g., the driver module 110) and control circuits of the speed control system 100 may also be included in the noise model.

A noise model for the detected noise dv that is generated when measuring the position of the magnetic poles from the detected BEMF is described below. The detected noise dv includes a noise component due to the position deviation of the magnetic poles (i.e., due to pole mismatch). The noise component due to pole mismatch is denoted by $dv_{PM}$.

Additionally, the detected noise dv includes a white-noise component $dw_v$. The white-noise component $dw_v$ can be a dispersion of jitter in the detected BEMF when the position of the magnetic poles is measured (i.e., when the actual speed of the rotor is measured) based on the BEMF. Thus, the noise in the measured speed includes the pole mismatch noise component $dv_{PM}$ and the white-noise component $dw_v$.

A value obtained by time-differentiating the pole mismatch noise component $dv_{PM}$ and the white-noise component $dw_v$ denotes the detected noise dv that gets added to the measured speed. The noise model for the detected noise dv includes an adding point 240 that adds the $dv_{PM}$ to the $dw_v$ and a transfer function S 242. The transfer function S 242 time-differentiates a sum of the pole mismatch noise component $dv_{PM}$ and the white-noise component $dw_v$.

A noise model for the force disturbance df that is generated when measuring the position of the magnetic poles is described below. In the spindle motor 18, the drive voltage or the drive current is generated based on the control signal output by the spindle control module 120. Noise occurring in analog portions of the spindle control module 120 and the driver module 110 (hereinafter analog circuits) is added to the drive voltage or the drive current. Accordingly, the force disturbance df caused by the analog circuits is added to the controlled variable U of the noise model shown in FIG. 3.

The force disturbance df is called pink noise. Pink noise is noise having energy inversely proportional to frequency. The noise model for the force disturbance df includes a transfer function 250 that multiplies the white noise component $dw_f$ by $s^{-1/2}$, where s is a Laplace operator.

Based on the noise model shown in FIG. 3, $\omega_{err}$ can be expressed by the following equation:

$$\omega_{err} = \frac{1}{1+C(z)P(z)}\omega_{ref} + \frac{1}{1+C(z)P(z)} \cdot dv - \frac{P(z)}{1+C(z)P(z)} \cdot df \quad (1)$$

Since $\omega_{ref}$ does not change over time, the first term on the right hand side of the equation can be ignored. When $\omega_{ref}$ changes over time, the first term can be ignored as long as the rate of change of $\omega_{ref}$ over time is sufficiently slow, and the gain of the sensitivity function $1/(1+C(z)P(z))$ in the frequency domain where $\omega_{ref}$ changes is sufficiently small.

Since $dv = s(dv_{PM}+dw_v)$ and $df=(dw_f/s)^{-1/2}$, equation (1) becomes $$\omega_{err} = \frac{1}{1+C(z)P(z)} \cdot s \cdot (dv_{PM}+dw_v) - \frac{P(z)}{1+C(z)P(z)} \cdot \sqrt{\frac{dw_f}{s}} \quad (2)$$

Since $\omega^*_{err}=(\omega_{err}-dv)$, $\omega_{err}$ can be expressed by the following equation:

$$\omega_{err} = \frac{C(z)P(z)}{1+C(z)P(z)} \cdot s \cdot dv_{PM} - \quad (3)$$

$$\frac{C(z)P(z)}{1+C(z)P(z)} \cdot s \cdot dw_v - \frac{P(z)}{1+C(z)P(z)} \cdot \sqrt{\frac{dw_f}{s}}$$

When $S=1/(1+(C(z)P(z)))$, $D=P(z)/(1+(C(z)P(z)))$, and $L=(C(z)P(z))$, equations (2) and (3) can be transformed into equations (4) and (5), respectively, as follows:

$$\omega_{err} = S \cdot s \cdot dv_{PM} + S \cdot s \cdot dw_v - D \cdot \sqrt{\frac{dw_f}{s}} \quad (4)$$

$$\omega_{err} = -L \cdot S \cdot s \cdot dv_{PM} - L \cdot S \cdot s \cdot dw_v - D \cdot \sqrt{\frac{dw_f}{s}} \quad (5)$$

where S denotes a sensitivity function, D denotes settling time, and L denotes an open loop characteristic of the speed control system 100.

As shown in equation (4), the signal indicating the error between the measured speed and the desired speed (hereinafter the error signal) includes $S \cdot s \cdot dv_{PM}$. $S \cdot s \cdot dv_{PM}$ denotes an error component caused by the pole mismatch noise component $dv_{PM}$. $S \cdot s \cdot dw_v$ denotes an error component caused by the white noise component $dw_v$. $D \cdot (dw_f/s)^{-1/2}$ denotes an error component caused by the white noise component $dw_f$.

The frequency components of the error signal are divided into the following error components: the error component caused by the pole mismatch noise component $dv_{PM}$, the error component caused by the white noise component $dw_v$, and the error component caused by the white noise component $dw_f$. The error components are corrected using transfer characteristics of the modules and circuits of the speed control system 100. For example, the error component caused by the pole mismatch noise component $dv_{PM}$ and the error component caused by the white noise component $dw_f$ are corrected by multiplying each by (L) in the frequency domain.

Figure 4A:
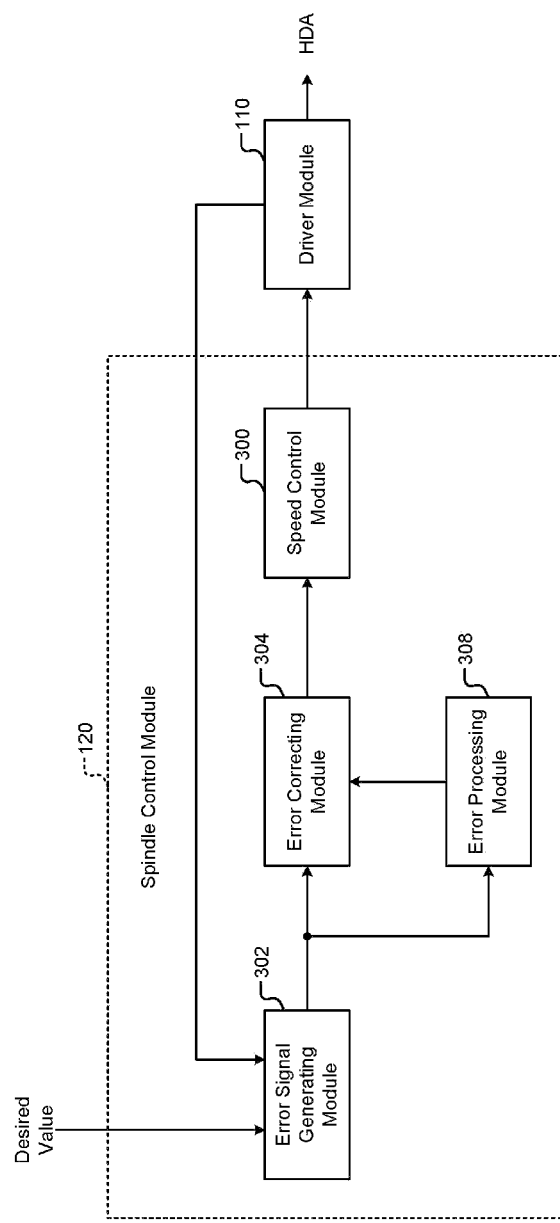
FIG. 4A is a functional block diagram of a spindle control module of the speed control system of FIG. 2.
Figure 4B:
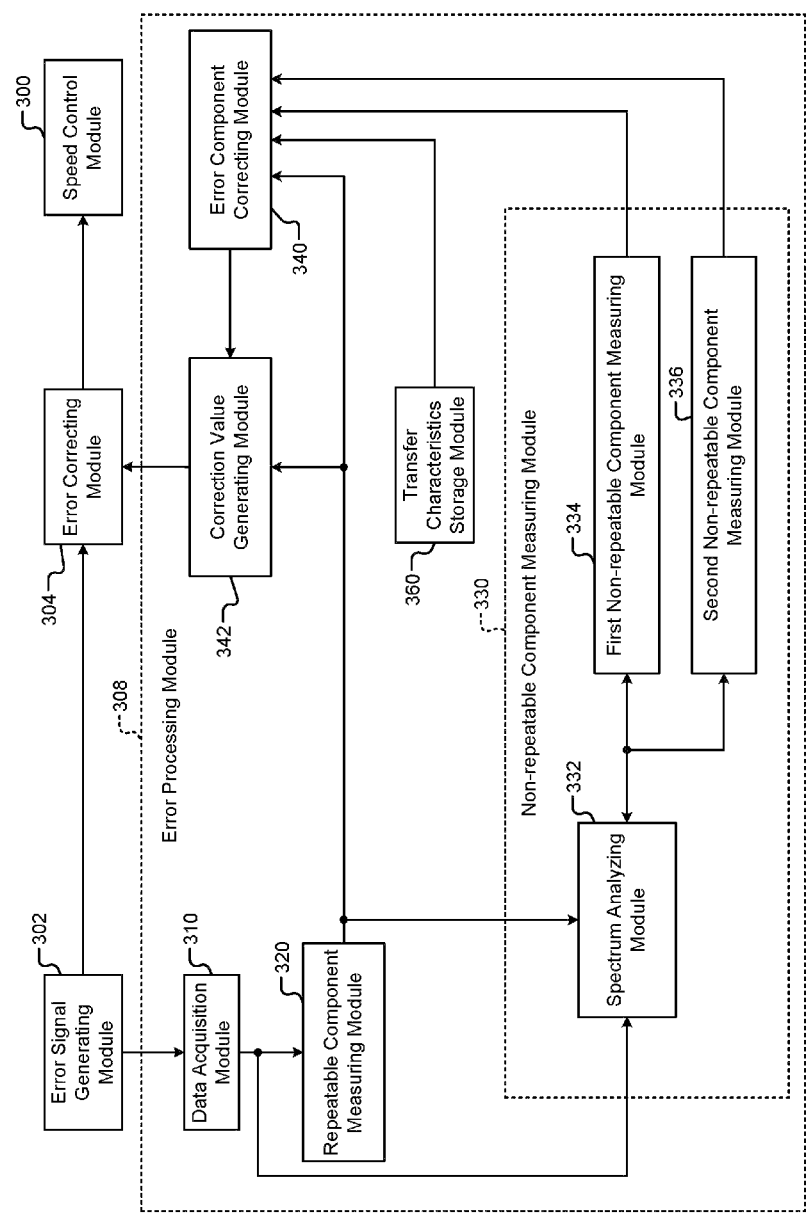
FIG. 4B is a functional block diagram of an error processing module of the spindle control module of FIG. 4A.
Figure 4C:
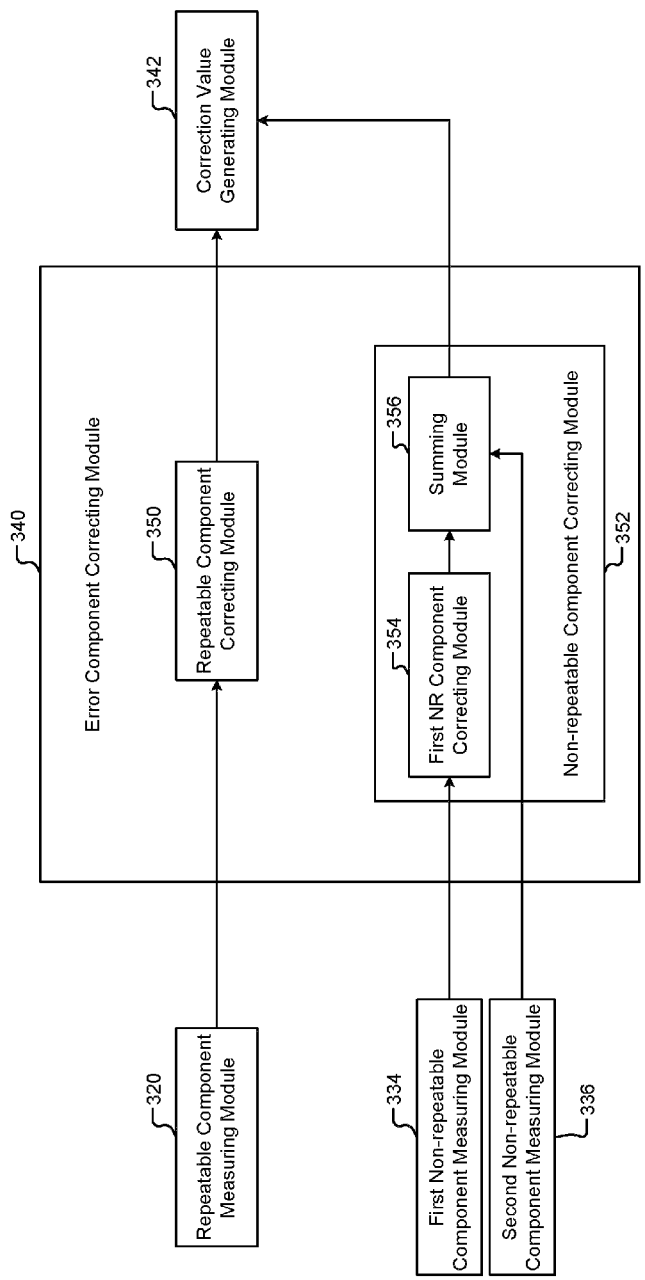
FIG. 4C is a functional block diagram of an error component correcting module of the error processing module of FIG. 4B.

Referring now to FIGS. 4A-4C, the spindle control module 120 is shown in detail. In FIG. 4A, the spindle control module 120 comprises a speed control module 300, an error signal generating module 302, an error correcting module 304, and an error processing module 308. In FIG. 4B, the error processing module 308 comprising an error component correcting module 340 is shown in detail. In FIG. 4C, the error component correcting module 340 is shown in detail. The spindle control module 120 analyzes the transfer characteristics of the speed control module 300 and the spindle motor 18 and controls the speed of the spindle motor 18 based on the analysis.

Although not specifically discussed, it should be understood that the spindle control module 120 may also analyze transfer functions of additional control modules or circuits that control the operation of the spindle motor 18. For example, the spindle control module 120 may also analyze a transfer function of the driver module 110.

The speed control module 300 controls the speed of the spindle motor 18 based on the error signal corrected by the error correcting module 304. The error signal generating module 302 generates the error signal based on the difference between the desired speed received from the HDC module 30 and the detection signal indicating the actual speed (i.e., measured speed) of the spindle motor 18 received from the driver module 110. The error signal generating module 302 outputs the error signal to the error processing module 308 and the error correcting module 304.

In FIG. 4B, the error processing module 308 comprises a data acquisition module 310, a repeatable component measuring module 320, a non-repeatable component measuring module 330, a transfer characteristic storage module 360, the error component correcting module 340, and a correction value generating module 342. In FIG. 4C, the error component correcting module 340 comprises a repeatable component correcting module 350 and a non-repeatable component correcting module 352. The non-repeatable component correcting module 352 further comprises a first non-repeatable component correcting module 354 and a summing module 356. The operation of the error processing module 308 is now described in detail.

The data acquisition module 310 acquires an error output from the error signal generating module 302. The error output includes time-series data of the error between the desired value and the measured speed of the spindle motor 18. The data acquisition module 310 acquires the error output by acquiring the error signal from the error signal generating module 302 over a predetermined time interval. The time-series data includes the error components caused by the detected noise and the force disturbance. The time-series data is indicated by $\omega_{err}$ in the noise model shown in FIG. 3.

The repeatable component measuring module 320 measures repeatable components based on the error output. The repeatable components are repeatable error components at specific frequency bands in the error output and are generated by the pole mismatch noise component $dv_{PM}$.

The transfer characteristic storage module 360 stores the transfer function of the spindle motor 18 and the transfer function of the speed control module 300. These transfer functions are only examples of the transfer characteristics. Although not specifically discussed, it should be understood that the transfer characteristic storage module 360 may store transfer functions of additional control modules or circuits that control the operation of the spindle motor 18. For example, the spindle control module 120 may also store the transfer function of the driver module 110. The transfer characteristic storage module 360 may store the transfer functions in a storage medium such as memory (e.g., in the form of a lookup table).

The error component correcting module 340 corrects the repeatable component measured by the repeatable component measuring module 320. More specifically, the repeatable component correcting module 350 corrects the repeatable component based on the transfer functions stored in the transfer characteristic storage module 360. The repeatable component corrected by the repeatable component correcting module 350 is output to the correction value generating module 342. In some implementations, the error component correcting module 340 may store the transfer functions in the form of a lookup table instead of the transfer characteristic storage module 360.

The non-repeatable component measuring module 330 measures the non-repeatable component, which is the non-repeatable error component of the error output. The non-repeatable component measuring module 330 receives the error output acquired by the data acquisition module 310 and the repeatable component measured by the repeatable component measuring module 320. The non-repeatable component measuring module 330 measures the non-repeatable component as follows.

The non-repeatable component measuring module 330 comprises a spectrum analyzing module 332, a first non-repeatable component measuring module 334, and a second non-repeatable component measuring module 336. The spectrum analyzing module 332 divides the time-series data into frequency components by subtracting the repeatable component from the error output acquired by the data acquisition module 310.

The first non-repeatable component measuring module 334 measures the non-repeatable component of the detected noise. The non-repeatable component of the detected noise is a portion of the non-repeatable component. The non-repeatable component of the detected noise is generated by time-differentiating the white noise. The first non-repeatable component measuring module 334 measures the non-repeatable component of the detected noise based on the repeatable component, the transfer functions, and the frequency components obtained by the spectrum analyzing module 332 from the error output.

The second non-repeatable component measuring module 336 measures the non-repeatable component of the force disturbance. The non-repeatable component of the force disturbance is a portion of the non-repeatable component. The non-repeatable component of the force disturbance is the error component caused by the disturbance that occurs in the error output when the noise component having a frequency characteristic of energy inversely proportional to frequency is added to the controlled variable of the spindle motor 18 as disturbance. The second non-repeatable component measuring module 336 measures the non-repeatable component of the force disturbance based on the repeatable component, the transfer functions, and the frequency components obtained by the spectrum analyzing module 332 from the error output.

According to equation (2), the frequency components obtained by the spectrum analyzing module 332 include components in which the white noise component $dw_v$ and the white noise component $dw_f$ are affected by the transfer function $C(z)$ and the transfer function $P(z)$, respectively. The first and second non-repeatable component measuring modules 334, 336 use the frequency components obtained by the spectrum analyzing module 332, the transfer function $C(z)$, and the transfer function $P(z)$ to measure the non-repeatable components of the detected noise and the force disturbance, respectively.

The first non-repeatable component correcting module 354 corrects the non-repeatable component of the detected noise based on the transfer functions of the speed control module 300 and the spindle motor 18. The summing module 356 adds the corrected non-repeatable component of the detected noise and the non-repeatable component of the force disturbance to generate a corrected non-repeatable component. The corrected non-repeatable component is output to the correction value generating module 342.

The correction value generating module 342 adds the corrected repeatable component and the corrected non-repeatable component and generates a correction value for correcting the error component at the specific frequency bands in the error signal. Thus, the correction value generating module 342 generates the correction value based on the transfer functions.

The correction value is output to the error correcting module 304. The error correcting module 304 uses the correction value to correct the error signal and generates a corrected error signal. The speed control module 300 controls the speed of the spindle motor 18 based on the corrected error signal.

Figure 5A:
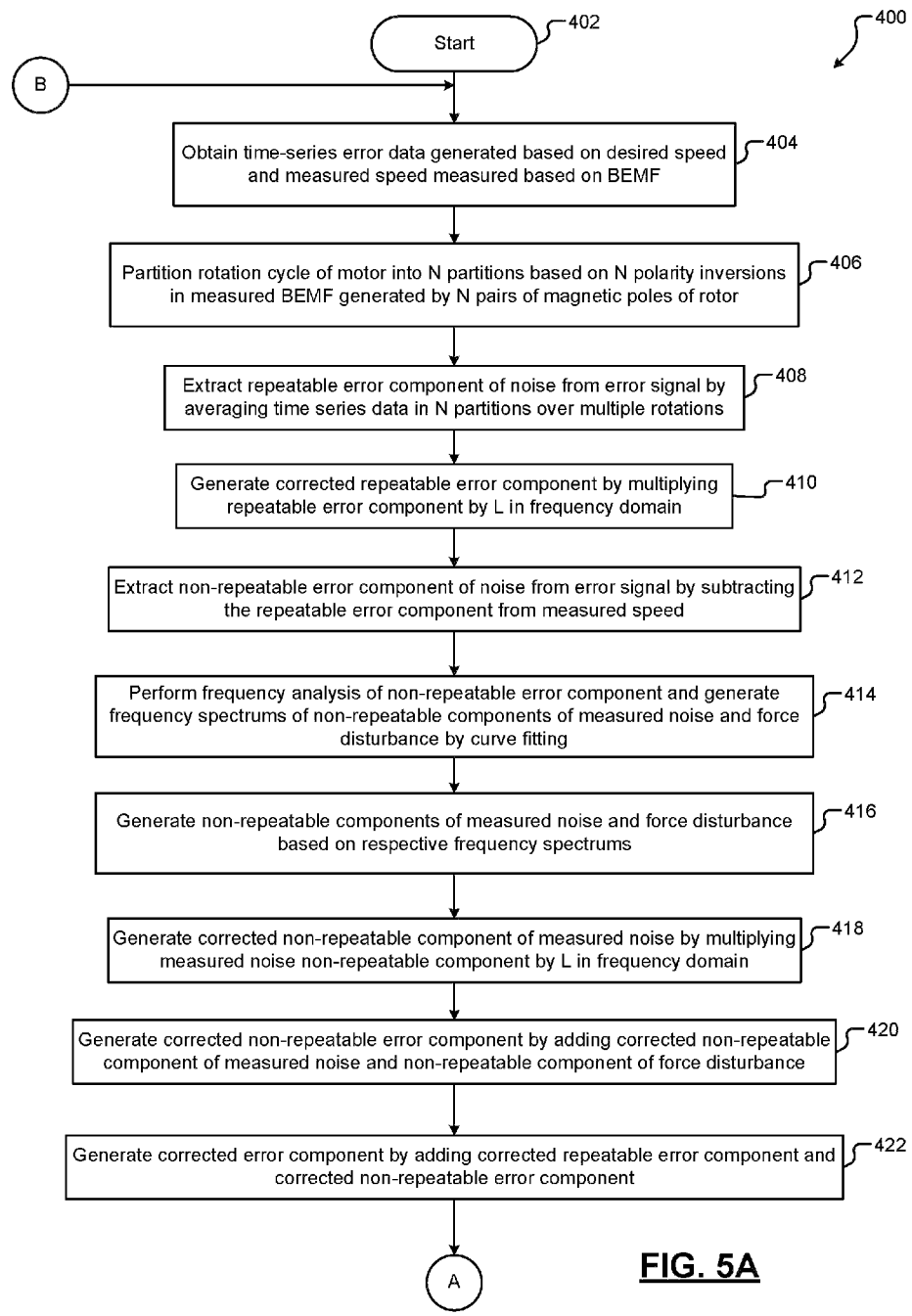
FIGS. 5A and 5B depict a flowchart of a method for controlling the speed of the spindle motor.
Figure 5B:
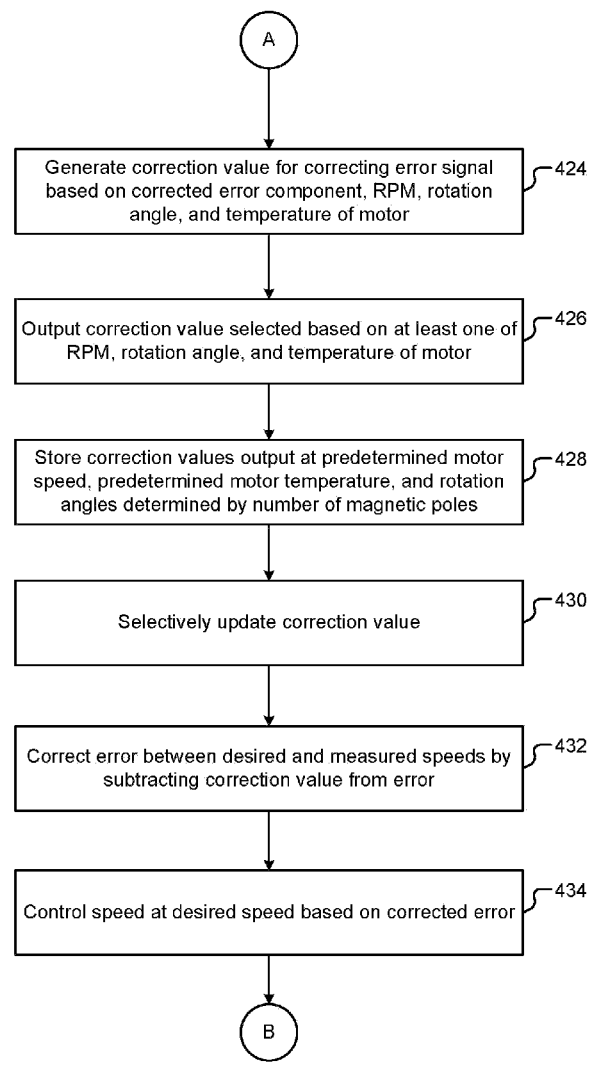

Referring now to FIGS. 5A and 5B, an exemplary method 400 for measuring and correcting the repeatable and non-repeatable error components of the noise in the measured speed is shown. In FIG. 5A, control begins in step 402. Control may implement all the modules of the speed control system 100. Accordingly, in the following description, relevant modules may be indicated in parentheses following the term control for example only. Any other module or a combination of two or more modules of the speed control system 100 may instead perform any of the steps performed by control.

In step 404, control (e.g., data acquisition module 310) receives the time-series error data generated based on the difference between the desired speed and the measured speed measured based on the BEMF. In step 406, control (e.g., data acquisition module 310) partitions a rotation cycle of the spindle motor 18 into multiple partitions based on a timing at which the BEMF output from the spindle motor 18 inverts. The rotation cycle can be partitioned based on the number of magnetic poles.

The rotation cycle can be partitioned into N partitions based on N polarity inversions detected in the BEMF, where the N polarity inversions are generated by N pairs of magnetic poles. The duration between the polarity inversions (i.e., the repetition rate of the polarity inversions) is determined by the number of magnetic poles and the speed of the spindle motor. For example, when the spindle motor 18 has six paired magnetic poles, the rotation cycle can be partitioned into six partitions.

In step 408, control (e.g., repeatable component measuring module 320) averages the time-series error data obtained in the same partition over a plurality of rotation cycles. By averaging the time-series error data, control can eliminate random noise from the error signal. By eliminating random noise, control can extract repeatable error component of the error signal. The repeatable error component includes the error component that repeats synchronously with the rotation angle of the spindle motor 18. The repeatable error component can be expressed by the first term on the right hand side of equation (4).

In step 410, control (e.g., repeatable component correcting module 350) corrects the repeatable error component using the transfer characteristics and generates a corrected repeatable error component. For example, control generates the corrected repeatable error component by multiplying the repeatable error component by L in the frequency domain.

In step 412, control (e.g., spectrum analyzing module 332) extracts the non-repeatable error component of noise from the error signal by subtracting the repeatable error component from the time-series error data. Thus, control generates the non-repeatable error component from which the repeatable error component at the specific frequency bands is eliminated.

In step 414, control (e.g., spectrum analyzing module 332) performs frequency analysis of the non-repeatable error component and generates frequency spectrums of the non-repeatable components of the detected noise and the force disturbance by performing curve fitting. The spectrum of the non-repeatable component of the detected noise is denoted by the second term on the right hand side of equation (4). The spectrum of the non-repeatable component of the force disturbance is denoted by the third term on the right hand side of equation (4).

The spectrum of the non-repeatable component of the detected noise including S·s is dominant at high frequencies. The spectrum of the non-repeatable component of the force disturbance including $D \cdot (s)^{-1/2}$ is dominant at low frequencies. Accordingly, control generates the spectrum of the non-repeatable component of the detected noise by fitting the spectrum of the non-repeatable error component at the high frequency band to the curve of $S \cdot s \cdot dw_v$. Control (e.g., spectrum analyzing module 332) generates the spectrum of the non-repeatable component of the force disturbance by fitting the spectrum of the non-repeatable error component at the low frequency band to the curve of $D \cdot (dw_s/s)^{-1/2}$.

In step 416, control (e.g., non-repeatable component measuring module 330) generates the non-repeatable components of the detected noise and the force disturbance based on the respective spectrums. Control (e.g., first non-repeatable component measuring module 334) generates the non-repeatable component of the detected noise by dividing the spectrum by $|S|^2/(|S|^2+|D|^2)$. Control (e.g., second non-repeatable component measuring module 336) generates the non-repeatable component of the force disturbance by dividing the spectrum by $|D|^2/(|S|^2+|D|^2)$.

In step 418, control (e.g., first non-repeatable component correcting module 354) generates corrected non-repeatable component of the detected noise using the transfer characteristics. For example, control generates the corrected non-repeatable component of the detected noise by multiplying the non-repeatable component of the detected noise by L in the frequency domain.

In step 420, control (e.g., summing module 356) generates corrected non-repeatable error component by adding the corrected non-repeatable component of the detected noise and the non-repeatable component of the force disturbance. In step 422, control (e.g., error component correcting module 340) generates corrected error component by adding the corrected repeatable error component and the corrected non-repeatable error component.

In FIG. 5B, in step 424, control (e.g., correction value generating module 342) generates a correction value for correcting the error signal based on the corrected error component. The correction value is generated based on at least one of a rotation angle, a temperature, and the speed (revolutions per minute or RPM) of the spindle motor 18. When the RPM and the temperature of the spindle motor 18 are fixed, the number of the rotation angles may be determined by the number of magnetic poles, where the rotation angles denote the positions of the magnetic poles. Accordingly, the correction values corresponding to the rotation angles correct errors caused by pole mismatch.

In step 426, control (e.g., correction value generating module 342) outputs the correction value selected according to at least one of the rotation angle, the temperature, and the RPM. In step 428, control (e.g., transfer characteristic storage module 360) stores the correction value output in association with the RPM, the temperature T, and the rotation angle θ of the rotor in a lookup table. In step 430, control (e.g., error component correcting module 340) selectively updates the correction value stored during a prior iteration by the correction value generated during a subsequent iteration.

In step 432, control (e.g., error correcting module 304) reads the correction value stored in the lookup table and corrects the error between the desired speed and the measured speed by subtracting the correction value from the error signal. In step 434, control (e.g., speed control module 300) sets the speed of the spindle motor 18 at the desired speed using the corrected error signal. Control returns to step 404 and repeats steps 404 through 434.

Figure 6A:
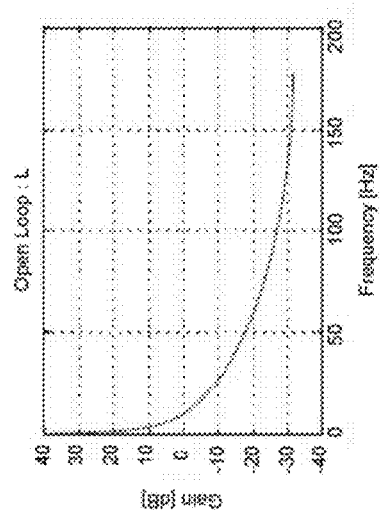
FIGS. 6A-6C depict exemplary transfer characteristics of the speed control system of FIG. 2.
Figure 6C:
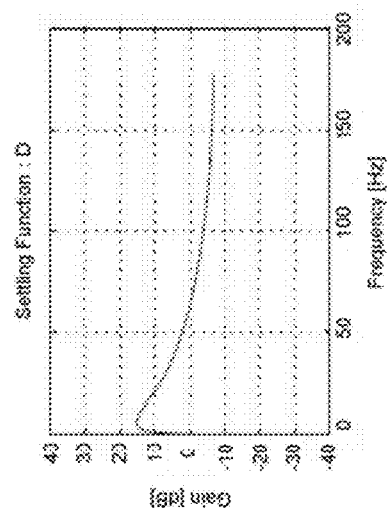
Figure 6B:
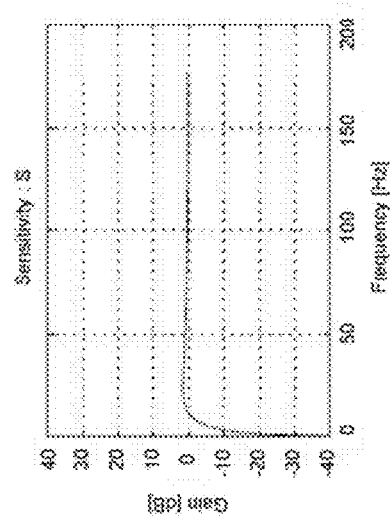

Referring now to FIGS. 6A, 6B, and 6C, exemplary transfer characteristics of the speed control system 100 are shown. In FIG. 6A, the open-loop characteristic L is shown. In FIG. 6B, the sensitivity function S is shown. In FIG. 6C, the settling function D is shown. In the examples shown, the spindle motor 18 having six paired magnetic poles is rotated at 3600 RPM. Accordingly, one rotation generates six polarity inversions in the BEMF, and the number of data samples obtained in 400 revolutions is 24000.

Figure 7B:
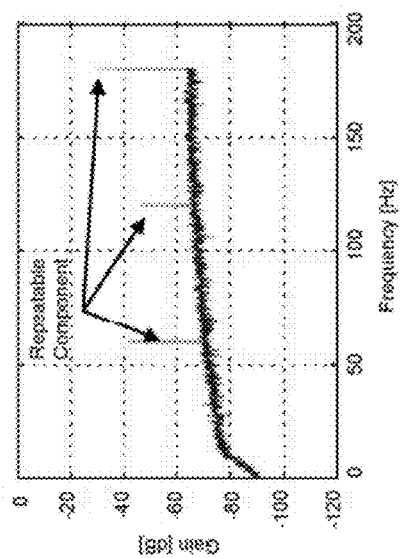
FIGS. 7A and 7B depict repeatable error components of the speed error.
Figure 7A:
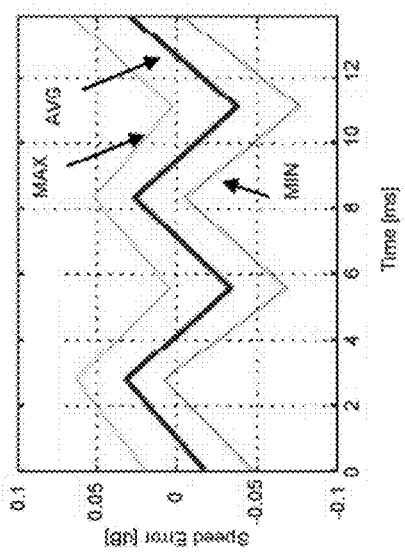

Referring now to FIGS. 7A and 7B, examples of the repeatable error component of the speed error are shown. In FIG. 7A, an example of the speed error in the time domain is shown. In FIG. 7B, an example of the speed error in the frequency domain is shown. In FIG. 7A, waveforms of maximum, minimum, and average values of the speed error are shown. As described above, the repeatable component measuring module 320 can extract the repeatable error component based on the average values.

The spectrum shown in FIG. 7B has peaks in the vicinity of 60 Hz, which is the frequency band at the rotation frequency of the spindle motor 18, and in the vicinities of 120 Hz and 180 Hz, which are the frequency bands at the harmonic frequencies of the rotation frequency. The spectrum may include a combination of one or more frequency bands. For example, the spectrum may include the frequency band at the rotation frequency and a plurality of frequency bands at the harmonic frequencies of the rotation frequency. The plurality of harmonic frequencies may be predetermined based on the number of magnetic poles of the spindle motor 18.

Figure 8A:
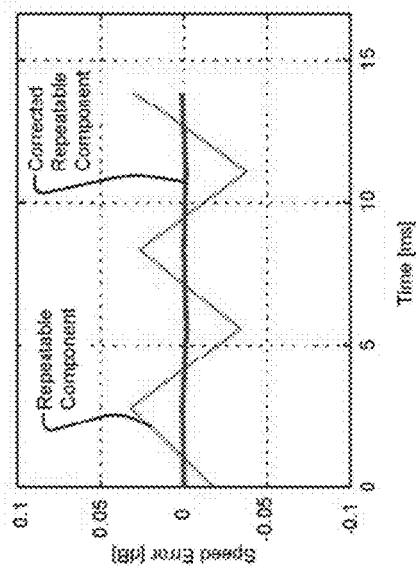
FIGS. 8A and 8B depict corrected repeatable error components of the speed error.
Figure 8B:
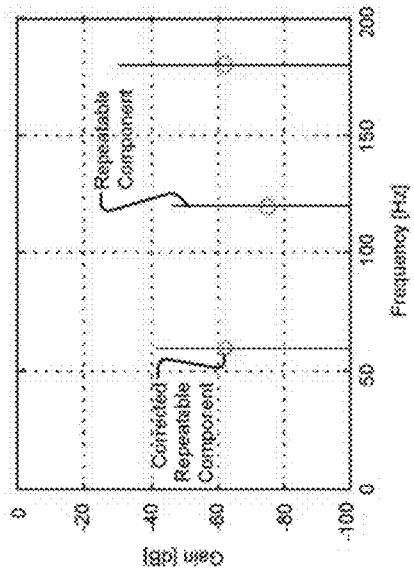

Referring now to FIGS. 8A and 8B, examples of the corrected repeatable component are shown. In FIG. 8A, the corrected and uncorrected repeatable error components in the time domain are shown. In FIG. 8B, the corrected and uncorrected repeatable error components in the frequency domain are shown. As shown, the corrected repeatable error component is reduced through the correction performed based on the transfer characteristics of the speed control system 100. For example, the corrected repeatable error component is reduced by a factor of L.

Figure 9:
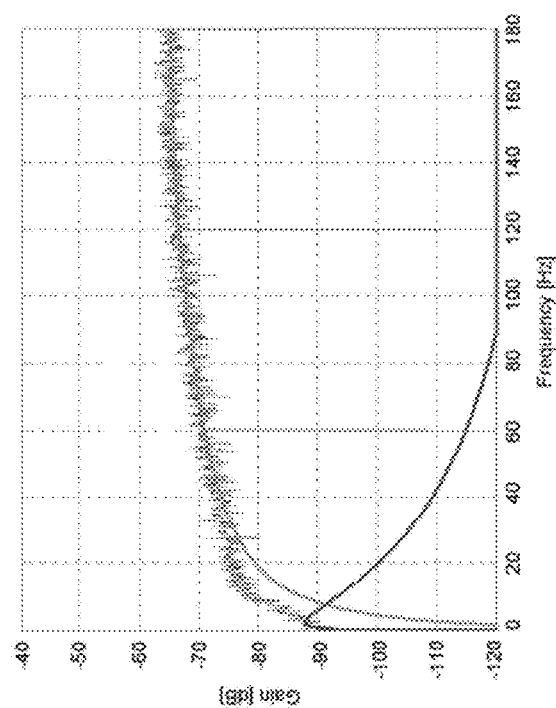
FIG. 9 depicts a spectrum of non-repeatable error components of the speed error.

Referring now to FIG. 9, the spectrum of the non-repeatable error component is shown. Also shown is a result obtained by fitting this spectrum with the spectrum of the non-repeatable component of the detected noise (second term on right hand side of equation (4)) and the spectrum of the non-repeatable component of the force disturbance (third term on right hand side of equation (4)). Additionally referring to FIGS. 6B and 6C, it can be seen that the spectrum of the non-repeatable component of the detected noise including S·s is dominant at high frequencies, and the spectrum of the non-repeatable component of the force disturbance including $D·(s)^{-1/2}$ is dominant at low frequencies.

Figure 10A:
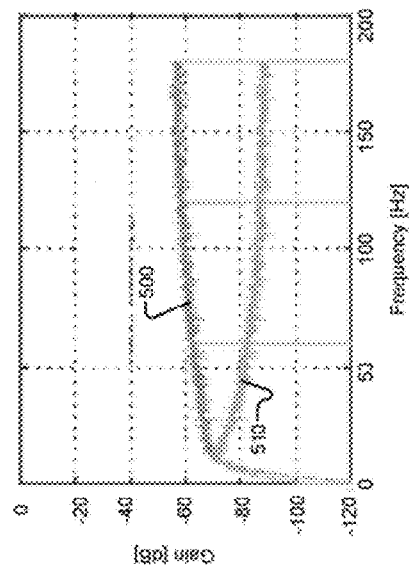
FIGS. 10A and 10B depict corrected non-repeatable error components of the speed error.
Figure 10B:
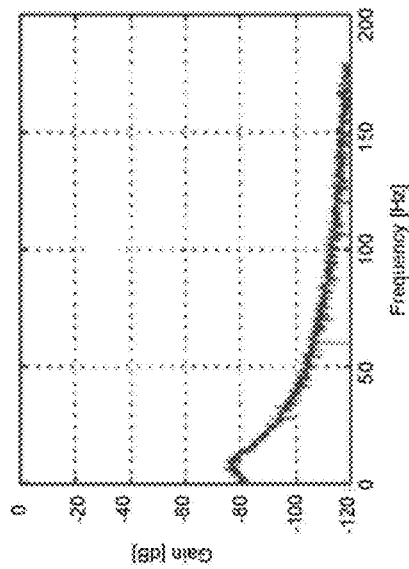

Referring now to FIGS. 10A and 10B, the corrected non-repeatable error components are shown. In FIG. 10A, an exemplary spectrum of the non-repeatable component of the force disturbance is shown. In FIG. 10B, an exemplary spectrum 500 of the non-repeatable component of the detected noise and an exemplary spectrum 510 of the corrected non-repeatable component of the detected noise are shown. As shown in FIG. 10B, the correction made by multiplying the non-repeatable component of the detected noise by L decreases the bandwidth of the non-repeatable component of the detected noise. Thus, the spindle control module 120 can correctly analyze the non-repeatable component of the detected noise based on the transfer characteristics of the speed control system 100.

Referring now to FIG. 11, a table of exemplary data output by the error processing module 308 is shown. The error processing module 308 outputs the error correction value according to the RPM, the temperature T, and the rotation angle θ of the rotor. The error correcting module 304 corrects the error in the measured speed by subtracting the correction value from the error.

Figure 12:
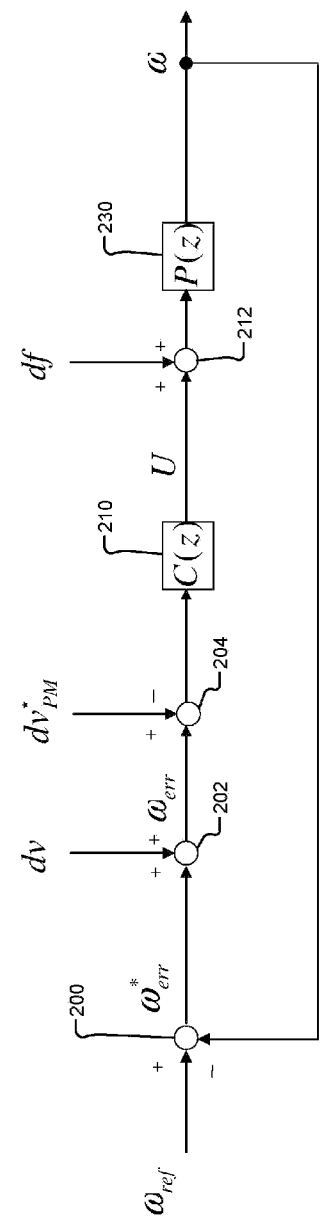
FIG. 12 is a schematic of a noise model that includes the error correction performed of the speed control system of FIG. 2.

Referring now to FIG. 12, the correction performed by the error correcting module 304 is shown. FIG. 12 differs from FIG. 3 in that FIG. 12 includes an adding point 204. The functions of elements in FIGS. 12 and 3 having the same reference numerals are substantially identical. Accordingly only differences between FIGS. 12 and 3 are described below.

The error correction value $dv^*_{PM}$ is subtracted from $\omega_{err}$ at the adding point 204, and the resulting value is input to the transfer function 210. The error correction value $dv^*_{PM}$ may be stored in association with the RPM, the rotation angle, and the temperature of the spindle motor 18. The error correcting module 304 corrects the error signal in the frequency domain based on the error correction value $dv^*_{PM}$. The correction can decrease the variation in the values of the drive voltage or the drive current. Accordingly, the speed control system 100 can decrease the power consumed by the spindle motor 18 in addition to eliminating the noise caused by the spindle motor 18.

Since the speed of the spindle motor 18 is maintained at the desired speed, the error component caused by the pole mismatch occurs substantially cyclically in the error signal. When the speed fluctuates, the error component caused by the pole mismatch fluctuates synchronously with the speed. The repeatable component, which is the error component caused by the pole mismatch, is synchronized with the speed. The non-repeatable component is not synchronized with the speed. The error processing module 308 can analyze the repeatable component that is synchronized with the speed as well as the non-synchronized component that is not synchronized with the speed. Thus, the speed control system 100 can control the speed of the spindle motor 18 at the desired speed.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
    a speed control module that controls a speed of a motor based on an error signal generated based on a desired speed and back electromotive force, wherein said error signal includes a repeatable component of noise;
    a repeatable component measuring module that measures said repeatable component; and
    a repeatable component correcting module that corrects said repeatable component based on transfer characteristics of said speed control module and said motor and that generates a corrected repeatable component.

2. The system of claim 1 wherein said desired speed is of said motor, and wherein said back electromotive force is sensed from said motor.

3. The system of claim 1 wherein said error signal further includes non-repeatable components of said noise, said system further comprising:
    a non-repeatable component measuring module that measures said non-repeatable components; and
    a non-repeatable component correcting module that corrects said non-repeatable components based on said transfer characteristics.

4. The system of claim 3 wherein:
    said non-repeatable components include a first component due to white noise and a second component due to pink noise; and
    said non-repeatable component measuring module measures said first and second components based on said error signal and said repeatable component.

5. The system of claim 4 wherein said non-repeatable component correcting module further comprises:

a first component correcting module that corrects said first component based on said transfer characteristics and that generates a corrected first component; and a summing module that generates a corrected non-repeatable component by summing said corrected first component and said second component.

6. The system of claim 5 further comprising:

a correction value generating module that generates a correction value based on said corrected non-repeatable component and said corrected repeatable component; and an error component correcting module that generates a corrected error signal based on said correction value and said error signal.

7. The system of claim 6 wherein said speed control module controls said speed of said motor based on said corrected error signal.

8. The system of claim 6 wherein said error component correcting module updates said correction value based on changes in said speed.

9. The system of claim 6 wherein said correction value corresponds to one or more of a rotation angle of a rotor of said motor, a temperature of said motor, and revolutions per minute (RPM) of said motor.

10. A hard disk drive (HDD) comprising:

a hard disk controller (HDC) that comprises the system of claim 1; and said motor that rotates a magnetic storage medium of said HDD at said desired speed.

11. An optical disc drive comprising:

an optical disc drive controller that comprises the system of claim 1; and said motor that rotates an optical storage medium of said optical disc drive at said desired speed.

12. A method comprising:

controlling a speed of a motor using a speed control module based on an error signal that is generated based on a desired speed and back electromotive force and that includes a repeatable component of noise;

measuring said repeatable component;

correcting said repeatable component based on transfer characteristics of said speed control module and said motor; and generating a corrected repeatable component.

13. The method of claim 12 wherein said error signal further includes non-repeatable components of said noise, said method further comprising:

measuring said non-repeatable components; and correcting said non-repeatable components based on said transfer characteristics.

14. The method of claim 13 wherein said non-repeatable components include a first component due to white noise and a second component due to pink noise, said method further comprising:

measuring said first and second components based on said error signal and said repeatable component.

15. The method of claim 14 further comprising:

correcting said first component based on said transfer characteristics;

generating a corrected first component; and generating a corrected non-repeatable component by summing said corrected first component and said second component.

16. The method of claim 15 further comprising:

generating a correction value based on said corrected non-repeatable component and said corrected repeatable component; and generating a corrected error signal based on said correction value and said error signal, wherein said correction value corresponds to one or more of a rotation angle of a rotor of said motor, a temperature of said motor, and revolutions per minute (RPM) of said motor.

17. The method of claim 16 further comprising controlling said speed of said motor based on said corrected error signal.

18. The method of claim 16 further comprising updating said correction value based on changes in said speed.

19. The method of claim 12 further comprising:

controlling a rotating storage device comprising said motor and said control module; and rotating a storage medium of said rotating storage device at said desired speed using said motor and said control module.

20. The method of claim 19 further comprising selecting said rotating storage device from a group consisting of a hard disk drive (HDD) and an optical disc drive.

* * * * *